Figure 1:
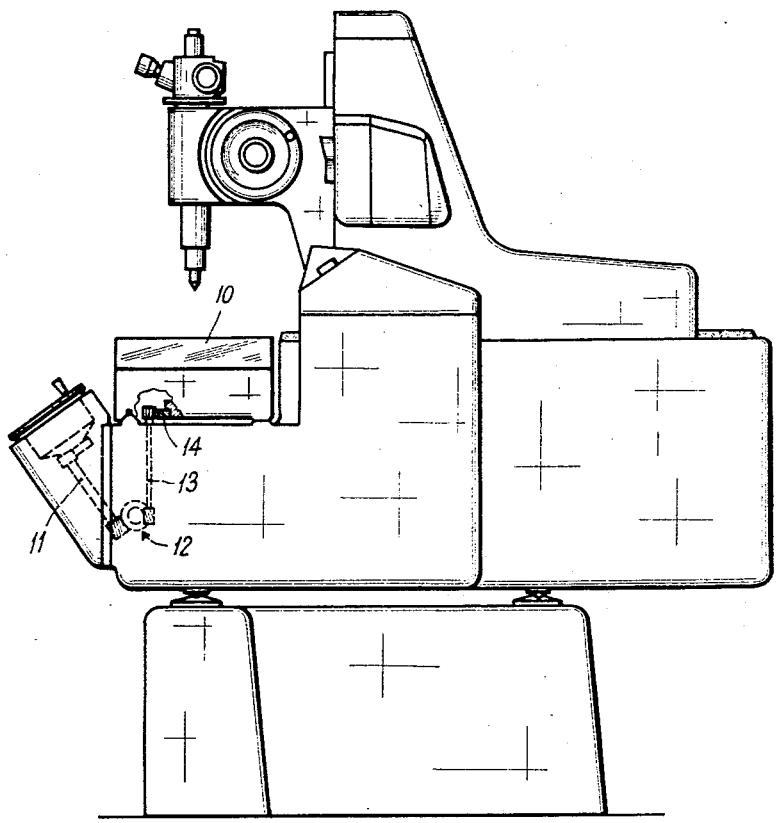

May 9, 1961 J. PETTAVEL 2,983,163
DRIVING MECHANISM
Filed June 19, 1959 2 Sheets-Sheet 1

May 9, 1961 J. PETTAVEL 2,983,163
DRIVING MECHANISM
Filed June 19, 1959 2 Sheets-Sheet 2

United States Patent Office 2,983,163
Patented May 9, 1961

2,983,163
DRIVING MECHANISM
Jacques Pettavel, Geneva, Switzerland, assignor to Societe Genevoise d'Instruments de Physique, Geneva, Switzerland, a firm of Switzerland
Filed June 19, 1959, Ser. No. 821,443
Claims priority, application Switzerland June 24, 1958
2 Claims. (Cl. 74—665)

The present invention has for its object an arrangement for driving a rotary member in both directions under the control of either of two rotary coaxial control members wherein the two control members are mechanically separated from each other when the drive is ensured through one of them while they are interconnected when the drive is ensured by the other members with a different transmission ratio.

When the two control members providing different transmission ratios are mechanically interconnected, the drive of that member which has the transmission ratio nearest unity, produces an idle drive at a much higher speed of the other control member providing a much larger speed reducing ratio. The last mentioned control member opposes to this drive a resistance which is not negligible chiefly when the transmission ratio is large. It may even occur that the mechanism is non-reversible, in which case the drive of the control member providing the largest speed reduction is impossible.

It has been attempted to remove said drawback by providing a disconnectable clutch between the two control members, but this arrangement requires a supplementary operation whenever one of the transmission ratios is selected.

The present invention cuts out the necessity of this operation and it ensures a connection between the two control members by means of an automatic clutch including two coaxial elements, of which one is provided with a cylindrical surface and the other is provided with a notch facing said cylindrical surface and housing a roller, ball or the like rolling member, while a spring holds elastically said rolling member inside the notch and away from the cylindrical surface and a race fitted with slight friction over a stationary pivot coaxial with said elements carries the rolling member. This arrangement is such that when one of the control members is driven into rotation, the rolling member subjected only to the action of the spring remains in the notch housing it at a distance from the cylindrical surface, without producing any coupling effect between the two coaxial elements of the clutch, whereas, when the other control member is driven into rotation, the rolling member runs, under the action of the race which remains transiently stationary and in antagonism with the action of the spring cooperating therewith over one of the sides of the notch rotating with the driven member so as to be wedged between said side and the cylindrical surface facing the notch whereby the two elements of the clutch are coupled and carry along with them the race.

Figure 2:
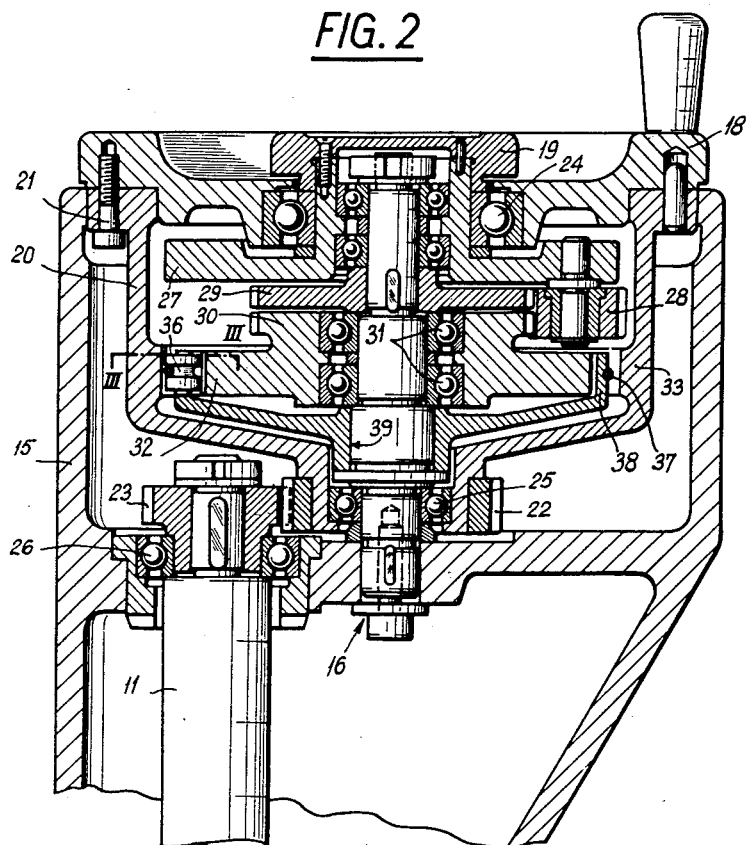
Figure 3:
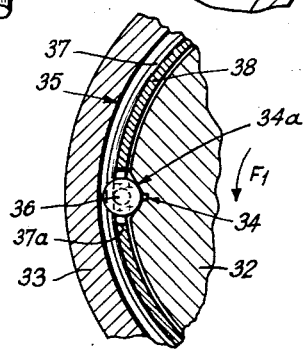

The accompanying drawings illustrate, by way of example, an embodiment of the invention, as applied to the controlling means for the bed of a measuring machine. In said drawings:

Fig. 1 illustrates the measuring machine in side view.
Fig. 2 is an axial cross-section of the driving means.
Fig. 3 is a cross-section through line III—III of Fig. 2.

The driving means illustrated are intended for the control of the longitudinal movements of the bed 10 of a measuring machine (Fig. 1). Said means drive said bed through the agency of a shaft 11, of a worm gear 12, of a shaft 13 and of a rack 14 rigid with said bed 10.

The driving means include further a frame 15 (Fig. 2) in which are carried the movable members of said means and also a pivot 16 rigid with a plate 17 of said frame. Its control members which are constituted by a handwheel 18 and by a knob 19 coaxial therewith allow driving selectively the shaft 11 through the agency of two different kinematic tracks.

The first track is intended to be used for the larger movements of the bed 10, while the second track defined by a speed reduction of say $\frac{1}{40}$ is adapted to provide the accurate adjustment of the location of the bed 10.

The first kinematic track or direct drive track includes chiefly a bell-shaped member 20 to which the fly-wheel 18 is secured by the screws 21 and which carries teeth 22 meshing with a pinion 23 coaxially rigid with the shaft 11. Said bell-shaped member revolves round the stationary pivot 16 with the interposition of two ball bearings 24 and 25. The shaft 11 is similarly mounted in a ball bearing 26 carried by the plate 17.

The second kinematic track includes a plate 27 rigid with the knob 19 and a planet pinion 28 revolvably carried by said plate round an eccentric point of the latter. The pinion 28 meshes simultaneously with a stationary toothed plate 29 carrying seventy-eight teeth keyed to the pivot 16 and with a toothed wheel 30 carrying eighty teeth revolvably mounted on the pinion 16 through the agency of the ball bearing 31.

When the knob 19 is driven into rotation, the planet pinion 28 rotates while remaining simultaneously in mesh with the toothed plate 29 and with the toothed wheel 30. For each revolution of the planet pinion 28 round the pivot 16, the wheel 30 rotates in the same direction as the knob 19 by an angle equal to the interval between two teeth. Said second kinematic track is non-reversible; in other words, it is impossible to drive the pinion 28 through rotation of the toothed wheel 30.

The toothed wheel 30 is in one with a disc 32 forming one of the components of a clutch of which the other component, concentric with the former is constituted by an annular inner flange or projection 33 rigid with the bell-shaped member 20. Said clutch is disengaged when movement is transmitted through the direct drive track controlled by the handwheel 18. In contradistinction, it couples automatically the bell-shaped member 20 with the wheel 30 when the drive of the bed is ensured by the knob 19.

The separation between the two kinematic tracks is essential when the table 10 is driven directly by the handwheel 18 by reason of the non-reversible character of the second kinematic track which would otherwise lock the whole arrangement if it were not disconnected.

The components 32 and 33 of the clutch include respectively, as shown in Fig. 3, a notch 34 and a cylindrical surface 35 facing each other. Said notch 34 forms a housing for a roller 36 inside which housing said roller is held elastically by an annular spring 37.

Said clutch includes furthermore a race 38 fitted rotatably with slight friction over a bearing section 39 formed on the pivot 16 and inside a gap in which the roller 36 is held so as to remain fast against rotation round the axis of the pivot. The spring 37 engages a groove formed in the outer wall of the race 38. The spacing between the cylindrical surface 35 and the peripheral surface of the disc 32 provided with the notch 34 is smaller than the diameter of the roller 36, but the actual notch has a depth such that the roller is no longer in contact with the surface 35, when it is engaged between the sides of said notch, as illustrated in Fig. 3.

The operation of said clutch is as follows:

(a) When the handwheel 18 is driven into rotation, the bell-shaped member rotates, but the roller 36 which is held away from the surface 35 by the spring 37 remains in its housing formed by the recess 34, so that no coupling is provided for the wheel 30 and disc 32 with the bell-shaped member 20.

On the other hand, when the knob 19 is driven into rotation, for instance in the direction of the arrow $F_1$, the operation is subdivided into three stages. During the initial stage, the roller 36 has a tendency to roll between the side 34a of the notch 34 and the spring 37; however, the reaction of the spring 37 being larger than the frictional force arising between the side 34a and the roller 36, the latter continues transiently remaining in its housing.

The second stage begins when, the disc 32 having rotated by a predetermined angle, the roller 36 engages the edge 37a of the gap carrying it in the race 38 and which has remained stationary during the initial stage. During said second stage, the roller has a tendency to make said race 38 rotate, but its action is not sufficient for overcoming the frictional resistance opposed by the latter, so that the roller is now constrained to roll over the side 34a against the action of the spring 37, which stretches. The third stage begins at the moment at which the roller engages the surface 35 and is wedged between said surface and the side 34a, whereby the disc 32 is coupled with the inner annular projection 33 and, consequently, the bell-shaped member 20 rotates in unison with the toothed wheel and also with the race 38.

When the rotation of the disc 32 stops, the spring 37 which had remained stretched during said rotation is released and urges the roller 36 back into the bottom of the notch 34 whereby the bell-shaped member 20 is no longer in clutch with the wheel 30.

What I claim is:

1. A dual control system adapted to drive a rotary part in both directions, comprising two rotary independent control members, a common member controlling the rotary part to be driven into rotation, two mechanisms of different transmission ratios connecting the corresponding control members with last-mentioned common member and one of which includes a terminal gear coaxial with the common member, a clutch inserted between said terminal gear of one of said transmission mechanisms and said common member and including in coaxial relationship a component provided with a cylindrical surface and a component provided with a notch facing said cylindrical surface, said coaxial components being rigid respectively with the common member and with the terminal gear, a roller carried inside said notch and slightly spaced from the cylindrical surface facing the notch, a spring urging said roller into the notch, a stationary pivot for the notched component and a race frictionally and coaxially fitted over the stationary pivot and provided with a transverse gap registering with the notch to hold the roller in the latter with a slight clearance, the roller abutting against the race and rising over a side of the notch into engagement with the cylindrical surface upon rotation of the notched member to provide engagement between the two clutch components.

2. A dual control system adapted to drive a rotary part in both directions, comprising two rotary independent control members, a common member controlling the rotary part to be driven into rotation, a bell-shaped member operatively connecting one of the control members with the part to be driven and including an inner annular projection having an inner cylindrical surface, a transmission mechanism controlled with a high speed reduction ratio by the second control member and including a member coaxial with the bell-shaped member and provided with a notch along its periphery facing the inner surface of the annular projection on the latter, a stationary pivot for the notched member, a race fitted coaxially over the stationary pivot, extending into registry with the inner cylindrical surface of the annular projection between the latter and the notched member and provided with an opening facing the notch, a roller normally carried inside the notch and projecting with a clearance between the edges of the opening in the race up to a small distance from the inner cylindrical surface of the annular projection and an annular spring fitted round the race and holding the roller in the notch, the rotation of the notched member urging the roller into contact with the race and then shifting the roller along a side of the notch into engagement with the inner surface of the annular projection to provide operative connection between the notched member and the annular projection and thereby operative connection between said transmission mechanism and the bell-shaped member.

References Cited in the file of this patent

UNITED STATES PATENTS

| 1,299,765 | Norton et al. | Apr. 18, 1919 |

FOREIGN PATENTS

| 630,504 | France | Aug. 23, 1927 |
| 635,154 | France | Dec. 20, 1927 |